United States Patent Office 3,658,804
Patented Apr. 25, 1972

3,658,804
PRODUCTION OF UREIDOMETHYLPHOS-
PHONIUM SALTS
Harro Petersen, Frankenthal, and Wolfgang Reuther,
Heidelberg, Germany, assignors to Badische Anilin- &
Soda-Fabrik Aktiengesellschaft, Ludwigshafen (Rhine),
Germany
No Drawing. Filed Apr. 16, 1969, Ser. No. 816,802
Claims priority, application Germany, Apr. 24, 1968,
P 17 68 276.7
Int. Cl. C07d 87/52
U.S. Cl. 260—244 R                                6 Claims

ABSTRACT OF THE DISCLOSURE

Production of ureidomethylphosphonium salts by reaction of methylolureas or alkoxymethylureas with tertiary phosphines in the presence of an acid, and the new ureidomethylphosphonium salts themselves which are flameproofing agents for textiles and starting materials for the production of textile finishing agents and pesticides.

---

This invention relates to the production of ureidomethylphosphonium salts by reaction of methylolureas or alkoxymethylureas with tertiary phosphines in the presence of an acid, and new substances obtainable by the process.

One object of this invention is a new process for the production of a large number of ureidomethylphosphonium salts in good yields and high purity in a simple manner.

Another object of this invention is the new ureidomethylphosphonium salts themselves.

These and other objects are achieved and ureidomethylphosphonium salts having the general formula:

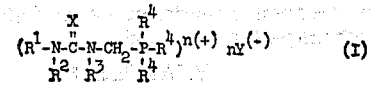

where the individual radicals $R^1$, $R^2$ and $R^3$ may be identical or different and each denotes an aliphatic, cycloaliphatic, araliphatic or aromatic radical, a hydrogen atom or the radical —$CH_2OR^5$ where $R^5$ denotes a hydrogen atom or an aliphatic radical, or the radicals $R^2$ and $R^3$ together with the adjacent ureido group may form a heterocyclic ring, $R^1$, $R^2$ and/or $R^3$ may also denote the radical:

the individual radicals $R^4$ may be identical or different and each denotes an aliphatic, cycloaliphatic, araliphatic or aromatic radical, X denotes an oxygen or sulfur atom, Y denotes the anion of an acid and $n$ denotes one of the integers from 1 to 4 are obtained advantageously by reacting an N-methylolurea or N-alkoxymethylurea having the general Formula II:

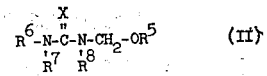

where the individual radicals $R^6$, $R^7$ and $R^8$ may be identical or different and each denotes an aliphatic, cycloaliphatic, araliphatic or aromatic radical, a hydrogen atom or the radical —$CH_2$—$OR^5$ where $R^5$ denotes a hydrogen atom or an aliphatic radical, the radicals $R^7$ and $R^8$ together with the adjacent ureido group may from a heterocyclic ring, $R^5$ and X have the meanings given above, or, instead of the starting material (II), a mixture of formaldehyde and a urea having the general Formula III:

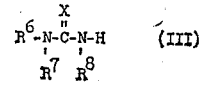

where the radicals $R^6$, $R^7$, $R^8$ and X have the meanings given above, with a tertiary phosphine having the general Formula IV:

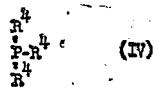

where the individual radicals $R^4$ have the meanings given above, in the presence of an acid in at least an equivalent amount with reference to starting material (II).

When N,N-dimethyl-N'-methylolurea, triphenyl phosphine and hydrogen bromide are used, the reaction may be represented by the following equation:

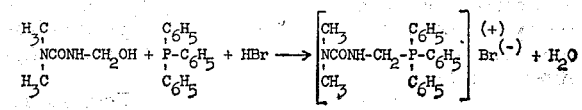

The process according to the invention surprisingly gives a large number of ureidomethylphosphonium salts in good yields and high purity and is easy to carry out.

N-methylolureas or N-alkoxymethylureas having four, three or preferably one or two methylol and/or alkoxymethyl groups attached to the nitrogen atoms are used as the starting material having the general Formula II. Preferred starting materials (II) and consequently preferred end products (I) are those in whose formulae the individual radicals $R^6$, $R^7$ and $R^8$ are identical or different and each denotes an alkyl, cycloalkyl, aralkyl or aryl radical in each case having up to ten carbon atoms, a hydrogen atom or the radical —$CH_2OR^5$ and $R^5$ denotes a hydrogen atom or an alkyl radical having up to six carbon atoms, $R^7$ and $R^8$ may also be combined with the adjacent ureido group to form a heterocyclic ring, preferably having five or six members, which may contain a further nitrogen atom or an oxygen atom in addition to the two nitrogen atoms of the ureido group and which may bear alkyl groups having up to six carbon atoms and/or phenyl groups as substituents, and X denotes an oxygen or sulfur atom.

For example the following N-methylolureas or N-alkoxymethylureas may be used as starting materials (II):

N-methylolethylenurea, N,N'-dimethylolethylenurea,
N-methyl-N'-methylolpropylenurea,
N,N'-di-(methoxymethyl)-4-oxotetrahydro-1,3,5-oxadiazine,
N,N'-di-(methoxymethyl)-ethylenurea,
N,N,N'-trimethoxymethylurea, N,N'-dimethylolthiourea,
N-cyclohexyl-N'-methylolurea, N-benzyl-N'-methylolurea,
N-phenyl-N'-ethoxymethylurea and
N-methoxy-methyl-2-oxohexahydro-1,3,5-triazine.

Mixtures of formaldehyde and ureas having the general Formula III which are capable of forming starting material (II) during the reaction can be used instead of starting material (II). Preferred starting materials (III) are those in whose formulae $R^6$, $R^7$, $R^8$ and X have the preferred meanings given above. In such a mixture, formaldehyde is generally used in a stoichiometric amount with reference to the replaceable hydrogen atoms on the two nitrogen atoms of starting material (III). If there is more than one replaceable hydrogen atom on the nitrogen atoms, and if only one hydrogen atom is to be substituted by formaldehyde, only the amount of formaldehyde equivalent to this one hydrogen atom is used. The starting material (III) and formaldehyde may be supplied to the reaction separately or mixed together. Formaldehyde may be added as an aqueous solution. Compounds which form formaldehyde under the reaction conditions, for example paraformaldehyde, trioxane or methylene methyl ether, may also be used.

When N-methylpropyleneurea is used as starting material (III) in the presence of hydrochloric acid, the reaction may be represented by the following equation:

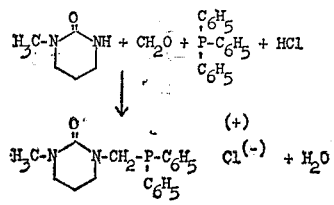

For example the following ureas may be used as starting material (III): urea, thiourea, N-methylurea, N,N'-dimethylurea, N,N-dimethylurea, N-ethyl-N'-propylurea, ethyleneurea, propyleneurea, 5,5-dimethylpropyleneurea, 4-methylpropyleneurea, 5,5 - dimethyl-6-isopropylpropyleneurea and equivalent thioureas and 2-oxo-5-ethylhexahydro-1,3,5-triazines.

Tertiary phosphines having the general Formula IV are reacted with the starting materials (II), as a rule in a stoichiometric amount with reference to the methylol and alkoxymethyl groups of starting material (II). If the starting material (II) has more than one methylol and/or alkoxymethyl groups and if it is desired to react only one of these groups or some of these groups, an amount of phosphine (IV) which is equivalent to the number of groups to be reacted is used. The reaction may also be carried out in different steps, for example by reacting starting material (II) only with an amount of phosphine equivalent to one group to be reacted and then reacting the ureidomethylmonophosphonium salt thus formed separately in a further step with an appropriate amount of phosphine to form the end product (I). In an analogous way, instead of starting material (II), mixtures of formaldehyde and urea (III) may be reacted with appropriate amounts of phosphine (IV). When using tetrahydrooxadiazines or 2-oxohexahydrotriazines as starting material (II) or (III), these are reacted with phosphines (IV) in stoichiometric amounts with reference to the methylol and alkoxymethyl groups of starting material (II) or (III) to be reacted.

Preferred phosphines (IV) and consequently preferred end products (I) are those in whose formulae the individual radicals $R^4$ are identical or different and each denotes an alkyl, cycloalkyl, aralkyl or aryl radical having up to ten carbon atoms. In the preferred end products (I) the radicals $R^1$, $R^2$ and $R^3$ have the abovementioned preferred meanings of $R^6$, $R^7$ and $R^8$, and moreover $R^1$, $R^2$ and/or $R^3$ may each denote the radical:

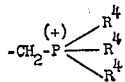

and $n$ denotes 1, 2, 3 or 4.

For example the following tertiary phosphines may be used as starting materials (IV): triphenyl phosphine, triethyl phosphine, ethyl diphenyl phosphine, benzyl phenyl methyl phosphine and tricyclohexyl phosphine.

The reaction is carried out in the presence of an acid in at least an equivalent amount with reference to starting material (II) or with reference to the starting material (II) formed during the reaction from the mixture of formaldehyde and urea (III). It is preferable to use from one to 3 times the equivalent amount of acid. Inorganic or organic acids, for example hydrogen chloride, sulfuric acid, phosphoric acid, hydrogen bromide, hydrogen iodide, perchloric acid; aliphatic carboxylic acids, for example acetic acid; sulfonic acids, for example p-toluenesulfonic acid or benzenesulfonic acid; or polycarboxylic acids, for example oxalic acid or adipic acid, may be used as the acids. The acids yield the anion or anions necessary for the formation of the ureidomethyl monophosphonium or polyphosphonium salts.

The reaction is carried out as a rule at a temperature of from 0° to 100° C., preferably from 40° to 80° C., at atmospheric or superatmospheric pressure, continuously or batchwise. It is advantageous to use solvents which are inert under the reaction conditions such as water; alcohols, for example methanol; cyclic ethers, for example dioxane or tetrahydrofuran; ketones, for example acetone; or mixtures of these solvents.

The reaction may be carried out as follows:

A N-methylolurea or N-alkoxymethylurea (II) or a mixture of a urea (III) with formaldehyde is reacted with a tertiary phosphine (IV) and at least an equivalent amount of acid (with or without a solvent) in a stirred apparatus at the abovementioned temperature for from thirty minutes to five hours while mixing well. The end product is precipitated from the reaction mixture on cooling and is filtered off or is separated after the mixture has been evaporated and cooled. It is usually of adequate purity and can be further purified by recrystallization if necessary.

The new compounds which can be prepared by the process according to the invention are flameproofing agents for textiles and valuable starting materials for the production of textile finishes and pesticides. Thus for example aqueous liquors can be prepared therewith using an amount of from 100 to 500 grams per liter of water (if desired together with N-methylol compounds for crease resist (finishing) for cotton cloth by applying said liquor, drying the cloth and treating it at temperatures of from 80° to 160° C. in a condensation unit.

The invention is illustrated by the following examples in which the parts are by weight.

EXAMPLE 1

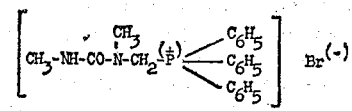

A mixture of 104.8 parts of triphenyl phosphine in 1600 parts of methanol and 70 parts of 48% hydrogen bromide solution has added to it a mixture of 52.8 parts of N,N'-dimethyl-N-methoxymethylurea and 160 parts of methanol and the whole is heated to refluxing temperature for four hours. The mixture is allowed to stand for one day at 0° C. and then the deposited end product is filtered off and dried. 118 parts of N,N'-dimethylureido-N-methyltriphenyl phosphonium bromide is obtained. This is a yield of 66.5% of the theory. The product is recrystallized from methanol to purify it. Melting point from 210° to 214° C. with decomposition.

Analysis.—Calculated for $C_{22}H_{24}ON_2PBr$ (443) (percent): C, 59.5; H, 5.63; N, 6.31; P, 6.98; Br, 18.00. Found (percent): C, 59.2; H, 5.8; N, 6.2; P, 6.6; Br, 17.8.

EXAMPLE 2

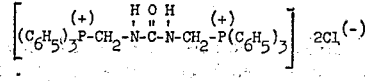

524 parts of triphenyl phosphine is dissolved in 15,000 parts of methanol and then 2000 parts of 1 N hydrochloric acid in dioxane is added. 148 parts of dimethoxymethylurea, dissolved in 500 parts of methanol, is added to this solution while mixing well and the whole is allowed to stand overnight at room temperature. Upon concentration in a thin film evaporator, a colorless residue is obtained which crystallizes when treated with a mixture of methanol and ethyl acetate. 119 parts (70% of the theory) of ureido-N,N'-bis-(methyltriphenyl phosphonium chloride) is obtained having a melting point (recrystallized from a mixture of methanol and ethyl acetate) of 200° C. with decomposition.

EXAMPLE 3

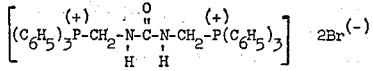

52.4 parts of triphenylphosphine is dissolved in 1200 parts of methanol and then 50 parts of 48% by weight hydrobromic acid is added. 14.8 parts of dimethoxymethylurea is added to this solution and the mixture is allowed to stand for thirty minutes at room temperature. Upon concentration in a thin-film evaporator with simultaneous injection of ethyl acetate, the end product is obtained immediately in the form of colorless crystals. 70 parts (90% of the theory) of ureido - N,N - bis - (methyltriphenyl phosphonium bromide) is obtained having a melting point (recrystallized from a mixture of methanol and ethyl acetate or from acetonitrile) of about 250° C. with decomposition.

Analysis.—Calculated for $C_{39}H_{36}N_2P_2Br_2$ (percent): C, 60.7; H, 4.68; N, 3.64; P, 8.05; Br, 20.80. Found (percent): C, 60.3; H, 5.0; N, 3.8; P, 7.4; Br, 21.1.

EXAMPLE 4

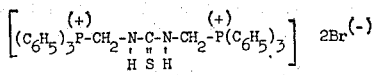

52.4 parts of triphenyl phosphine is dissolved in 1200 parts of methanol and then 50 parts of 48% hydrobromic acid is added. 16.4 parts of dimethoxymethylthiourea in 800 parts of methanol is then added while stirring. One hour later the solvent is removed in a thin-film evaporator and the residue is recrystallized from a mixture of methanol and ethyl acetate. 49.5 parts (62% of the theory) of thioureido - N,N' - bis - (methyltriphenyl phosphonium bromide) is obtained having a melting point of 232° C. with decomposition.

Analysis.—Calculated for $C_{39}H_{36}SP_2N_2Br_2$ (percent): C, 59.5; H, 4.58; S, 4.07; P, 7.89; N, 3.56; Br, 20.35. Found (percent): C, 59.1; H, 4.9; S, 3.8; P, 7.0; N, 3.4; Br, 20.4.

EXAMPLE 5

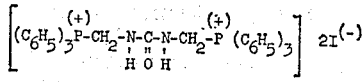

26.2 parts of triphenyl phosphine is dissolved in 500 parts of methanol and then 33 parts of a 57% hydroiodic acid is added. A solution of 7.4 parts of dimethoxymethylurea in 100 parts of methanol is added thereto while stirring and stirring is continued for about ten minutes. The solvent is removed in a thin-film evaporator and ethyl acetate is added. 22 parts (51% of the theory) of ureido-N,N' - bis - (methyltriphenyl phosphonium iodide) is obtained having a melting point of 230° C. (with decomposition) after recrystallization from methanol.

Analysis.—Calculated for $C_{39}H_{36}N_2P_2I_2$ (percent): C, 55.18; H, 4.12; N, 3.21; P, 7.09; I, 29.10. Found (percent): C, 54.5; H, 4.3; N, 3.2; P, 6.9; I, 28.9.

EXAMPLE 6

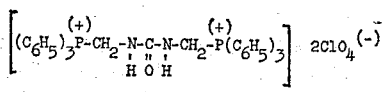

52.4 parts of triphenyl phosphine is dissolved in 1500 parts of methanol and then 180 parts of a 20% aqueous perchloric acid is added. While stirring, 14.8 parts of dimethoxymethylurea (dissolved in 50 parts of methanol) is added and stirring is continued for one hour. The solvent is removed in a thin-film evaporator and then ethyl acetate is added to the residue. 65 parts (80% of the theory) of ureido - N,N' - bis - (methyltriphenyl phosphonium perchlorate) is obtained. After recrystallization from methanol it has a melting point of 229° C. with decomposition.

Analysis.—Calculated for $C_{39}H_{36}N_2Cl_2P_2$ (percent): C, 58.90; H, 4.45; N, 3.47; Cl, 8.78; P, 7.67. Found (percent): C, 58.2; H, 4.8; N, 3.7; Cl, 8.6; P, 7.6.

EXAMPLE 7

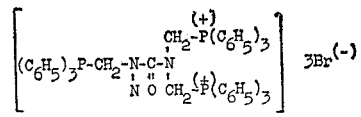

39.3 parts of triphenyl phosphine is dissolved in 800 parts of methanol in a stirred apparatus and 25.3 parts of 48% hydrobromic acid is added. While stirring 9.6 parts of N,N,N' - trimethoxymethylurea is added to this solution. The reaction mixture is heated at 50° C. for three hours and then allowed to cool. The deposited end product is suction filtered and dried. 43 parts of ureido-tris-N,N,N' - (methyltriphenyl phosphonium bromide) is obtained. This is a yield of 77.4% of the theory. The product may be recrystallized from methanol to purify it. Melting point 202° to 205° C.

EXAMPLE 8

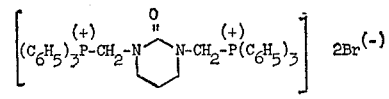

A solution of 37.6 parts of N,N' - dimethoxymethylpropylenurea in 80 parts of methanol is added in a stirred vessel to a solution of 104.8 parts of triphenyl phosphine in 800 parts of methanol and 100 parts of 48% hydrobromic acid. The reaction mixture is kept for three hours at from 64° to 65° C. and then cooled to 0° C. After the reaction mixture has been allowed to stand for one day, the end product is filtered off and dried. 149 parts of propylenurea - N,N' - di - (methyltriphenyl phosphonium bromide) is obtained, i.e. a yield of 92% of the theory. The product may be recrystallized from methanol to purify it. Melting point 240° C. with decomposition.

Analysis.—Calculated for $C_{42}H_{46}ON_2P_2Br_2$ (810) (percent): C, 62.2; H, 4.94; N, 3.46; P, 7.65; Br, 19.76. Found (percent): C, 62.0; H, 4.9; N, 3.30; P, 7.00; Br, 19.00.

EXAMPLE 9

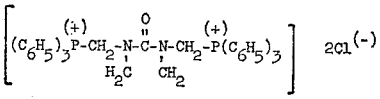

52.4 parts of triphenyl phosphine is dissolved in 1500 parts of methanol and then 200 parts of 1 N hydrochloric acid in dioxane is added. 14.6 parts of dimethylolethylenurea dissolved in 100 parts of methanol is added to this cold solution of the phosphonium salt with agitation. The mixture is allowed to stand overnight and is then evaporated to dryness at 30° to 40° C. in a thin-film evaporator. A colorless resin remains which is recrystallized from a mixture of dimethylformamide and ethyl acetate. 64 parts (90% of the theory) of 2-oxoimidazolidinyl-N,N'-bis(methyltriphenyl phosphonium chloride) is obtained. The melting point, after recrystallization from a mixture of methanol and ethyl acetate, is about 230° C. with decomposition.

EXAMPLE 10

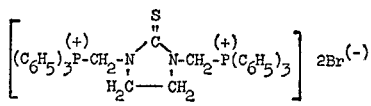

52.4 parts of triphenylphosphine is dissolved in 800 parts of methanol with an addition of 36 parts of 48% hydrobromic acid. A mixture of 19 parts of N,N'-dimethoxymethylethylenethiourea in 200 parts of methanol is added to this solution. The reaction mixture is heated for three hours at refluxing temperature (66° C.) and then cooled to 0° C. After the whole has been allowed to stand for one day, the end product is suction filtered and dried. 52 parts of ethylenethiourea-N,N'-di(methyltriphenyl phosphonium bromide) is obtained, i.e. yield of 64% of the theory. The product may be recrystallized from methanol to purify it. The melting point is from 228° to 235° C. with decomposition.

Analysis.—Calculated for $C_{41}H_{38}N_2P_2Br_2S$ (812) (percent): C, 60.6; H, 4.68; N, 3.45; P, 7.63; Br, 19.7; S, 3.94. Found (percent): C, 60.2; H, 4.7; N, 3.3; P, 7.4; Br, 19.3; S, 4.1.

EXAMPLE 11

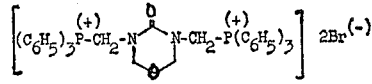

19 parts of N,N'-dimethoxymethyl-4-oxotetrahydro-1,3,5-oxadiazine is added while stirring to a mixture of 52.4 parts of triphenyl phosphine in 800 parts of methanol and 30 parts of 48% hydrobromic acid. After the whole has been heated at 50° C. for three hours it is cooled to room temperature, allowed to stand for one day, and the deposited end product is filtered off. 63 parts of 4-oxotetrahydro - 1,3,5 - oxadiazinyl-N,N'-di-(methyltriphenyl phosphonium bromide) is obtained. This is a yield of 77.5% of the theory. The product is recrystallized from methanol to purify it. The melting point is from 221° to 223° C. with decomposition.

Analysis.—Calculated for $C_{41}H_{38}O_2N_2P_2Br_2$ (812) (percent): C, 60.6; H, 4.78; N, 3.45; P, 7.64; Br, 19.7. Found (percent): C, 59.8; H, 5.00; N, 3.20; P, 7.30; Br, 19.0.

EXAMPLE 12

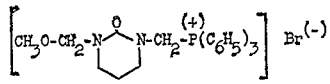

37.6 parts of N,N'-dimethoxymethylpropyleneurea is dissolved in 1600 parts of methanol and while stirring a solution of 52.4 parts of triphenyl phosphine and 50 parts of 48% hydrobromic acid in 1200 parts of methanol is added in portions in the course of three hours. The mixture is allowed to stand overnight and then the methanol is removed in a thin-film evaporator. A yellow resin remains which is taken up in methanol and precipitated in crystalline form by adding ethyl acetate. 29 parts (41% of the theory) of 2-oxo-N-methoxymethyl-hexahydropyrimidyl - N' - methyltriphenyl phosphonium bromide is obtained. The melting point after recrystallization from a mixture of methanol and ethyl acetate is 210° C. with decomposition.

EXAMPLE 13

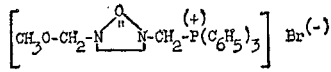

34.8 parts of N,N'-dimethoxymethylethylenurea is dissolved in 1600 parts of methanol and then a solution of 52.4 parts of triphenyl phosphine and 50 parts of 48% hydrobromic acid in 1200 parts of methanol is slowly added in the course of three hours. The mixture remains standing overnight and the solvent is removed in a thin-film evaporator while at the same time injecting ethyl acetate. 48.5 parts (50% of the theory) of 2-oxoimidazolidinyl-N-methoxymethyl-N'-methyltriphenyl phosphonium bromide is obtained having a melting point of 175° C. with decomposition (after recrystallization from a mixture of methanol and ethyl acetate).

Analysis.—Calculated for $C_{24}H_{26}O_2N_2P_2Br$ (percent): C, 59.4; H, 5.36; O, 6.47; N, 5.65; P, 6.28; Br, 16.4. Found (percent): C, 59.4; H, 5.4; O, 4.7; N, 6.1; P, 6.5; Br, 17.4.

EXAMPLE 14

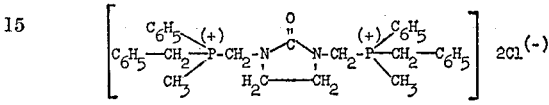

360 parts of 1 N methanolic hydrochloric acid is added to 77.0 parts of phenylbenzylmethyl phosphine under nitrogen. Then while stirring 31.3 parts of dimethoxymethylethyleneurea dissolved in 200 parts of methanol is added and the mixture is stirred for one hour at room temperature. The solvent is removed in a thin-film evaporator and ethyl acetate is added to the residue. A yellowish resin is obtained which crystallizes after some days. 80.2 parts (74% of the theory) of 2-oxoimidazolidinyl-N,N' - bis - (methyl-(phenylbenzylmethyl phosphonium chloride)) is obtained having a melting point of 125° C. with decomposition (after it has been recrystallized from a mixture of methanol and ethyl acetate).

We claim:

1. A ureidomethyl phosphonium salt having the formula:

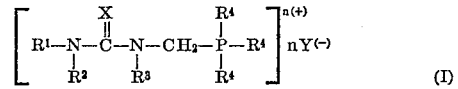

wherein the individual radicals $R^1$, $R^2$ and $R^3$ may be identical or different and each denotes an alkyl or cycloalkyl radical in each case having up to ten carbon atoms, benzyl or phenyl, a hydrogen atom or the radical

—$CH_2OR^5$ in which $R^5$ denotes a hydrogen atom or an alkyl radical having up to six carbon atoms, in which the radical $R^2$ and $R^3$, together with the adjacent ureido group may form a heterocyclic ring selected from the group consisting of ethyleneurea, propyleneurea, 4-oxatetrahydro-1,3,5-oxadiazine, and 2-oxohexahydro-1,3,5-triazine, which may bear alkyl groups having up to three carbon atoms as substituents, $R^1$, $R^2$ and/or $R^3$ may also denote the radical

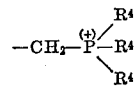

the individual radicals $R^4$ may be identical or different and each may denote an alkyl or cycloalkyl radical having up to ten carbon atoms, benzyl, or phenyl, X denotes an oxygen or sulfur atom, Y denotes the anion of an acid and $n$ denotes one of the integers from 1 to 4.

2. A process for the production of a ureidomethyl phosphonium salt having the formula:

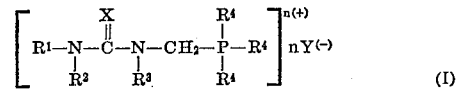

wherein the individual radicals $R^1$, $R^2$ and $R^3$ may be identical or different and each denotes an alkyl or cycloalkyl radical in each case having up to ten carbon atoms, benzyl, or phenyl, a hydrogen atom or the radical

—$CH_2OR^5$ in which $R^5$ denotes a hydrogen atom or an alkyl radical having up to six carbon atoms, the radicals $R^2$ and $R^3$ may also be combined with the adjacent ureido group to form a heterocyclic ring selected from the group consisting of ethylenurea, propylenurea, 4-oxotetrahydro-1,3,5-oxadiazine, and 2-oxohexahydro - 1,3,5 - triazine, which may bear alkyl groups having up to three carbon atoms as substituents, $R^1$, $R^2$ and/or $R^3$ may also denote the radical

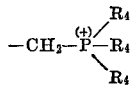

the individual radicals $R^4$ may be identical or different and each may denote an alkyl or cycloalkyl radical having up to ten carbon atoms, benzyl or phenyl, X denotes an oxygen or sulfur atom, Y denotes the anion of an acid, and $n$ denotes an integer from 1 to 4, wherein an N-methylolurea or N-alkoxymethylurea having the formula:

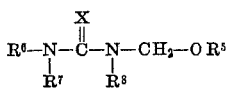 (II)

wherein the individual radicals $R^6$, $R^7$ and $R^8$ may be identical or different and each denotes an alkyl or cycloalkyl radical in each case having up to ten carbon atoms, benzyl or phenyl, hydrogen or the radical —$CH_2OR^5$ wherein $R^5$ denotes hydrogen or an alkyl radical having up to six carbon atoms, the radicals $R^7$ and $R^8$ together with the adjacent ureido group may form a heterocyclic ring selected from the group consisting of ethylenurea, propylenurea, 4-oxotetrahydro 1,3,5-oxadiazine, and 2-oxohexahydro-1,3,5-triazine, which may bear alkyl groups having up to three carbon atoms as substituents, $R^5$ and X have the meanings given above, or, instead of the starting material (II), a mixture of the formaldehyde and a urea having the general formula:

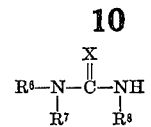 (III)

wherein the radicals $R^6$, $R^7$ and X have the above meanings is reacted with a tertiary phosphine having the general formula:

 (IV)

where the individual radicals $R^4$ have the above meanings in the presence of an acid in at least an equivalent amount with reference to starting material (II).

3. A process as claimed in claim 2 wherein the reaction is carried out with from one to three times the equivalent amount of acid.

4. A process as claimed in claim 3 carried out at a temperature of from 0° to 100° C.

5. A process as claimed in claim 3 carried out at a temperature of from 40° to 80° C.

6. A process as claimed in claim 3 wherein the reaction is carried out in the presence of an inert solvent.

References Cited

UNITED STATES PATENTS

| | | | |
|---|---|---|---|
| 2,339,621 | 1/1944 | D'Alelio | 260—552 R |
| 2,342,785 | 2/1944 | Bock et al. | 260—553 R |
| 3,520,925 | 7/1970 | Koenig et al. | 260—553 A |
| 3,065,110 | 11/1962 | Hogge et al. | 260—553 R |

OTHER REFERENCES

Chemical Abstracts, vol. 63; 11607 g., October 1965, Wiesboech.

HENRY R. JILES, Primary Examiner

S. D. WINTERS, Examiner

U.S. Cl. X.R.

260—552 R, 553 R, 553 A, 309.7, 251 P, 248 CS, 251 R; 252—8.1; 117—136